United States Patent [19]

Gelain

[11] Patent Number: 5,116,321
[45] Date of Patent: May 26, 1992

[54] FLUIDIZING AND SUCTION WITHDRAWAL UNIT INCLUDING A LEVEL SENSOR

[75] Inventor: Silvano Gelain, Abtwil, Switzerland

[73] Assignee: Gema Volstatic AG, St. Gallen, Switzerland

[21] Appl. No.: 684,293

[22] Filed: Apr. 12, 1991

[30] Foreign Application Priority Data

Apr. 14, 1990 [DE] Fed. Rep. of Germany ....... 4012190

[51] Int. Cl.$^5$ ............................................. B05B 5/025
[52] U.S. Cl. ..................... 118/694; 118/308; 118/309; 118/DIG. 5; 222/64
[58] Field of Search ............. 118/308, 694, DIG. 5, 118/309; 367/908; 222/64

[56] References Cited

U.S. PATENT DOCUMENTS

3,834,806 9/1974 Whited ............................. 118/694

FOREIGN PATENT DOCUMENTS

| 0337132 | 3/1989 | European Pat. Off. |
| 2425941 | 1/1975 | Fed. Rep. of Germany |
| 2945934 | 5/1980 | Fed. Rep. of Germany |
| 3027589 | 2/1981 | Fed. Rep. of Germany |
| 3815222 | 11/1989 | Fed. Rep. of Germany |

Primary Examiner—Michael G. Wityshyn
Assistant Examiner—Charles K. Friedman
Attorney, Agent, or Firm—Barnes & Thornburg

[57] ABSTRACT

A fluidizing and suction withdrawal unit (14) which can be lowered into a container (20) holding a powder (22), in order to fluidize the powder and withdraw the fluidized powder (92) by suction. The fluidizing and suction withdrawal unit (14) is provided with a level sensor (88) which generates a signal, in contingence on the immersion depth (80, 82) to which the fluidizing and suction withdrawal unit (14) is immersed in a powder layer (92) fluidized by it. This assures a consistent feed capacity which also in the case of direct connection of a spray device (76) results in the coating of articles at good coating qualities.

6 Claims, 1 Drawing Sheet

FLUIDIZING AND SUCTION WITHDRAWAL UNIT INCLUDING A LEVEL SENSOR

BACKGROUND OF THE INVENTION

1. Field of the Invention

The invention concerns a pneumatic powder feed, specifically for coating powder.

2. Description of the Related Art

Such a powder feed is known from the European patent documents 0 184 994 B1 and 0 337 132 A2. EP 0 184 994 B1 states that powder can be sucked from a powder container by a fluidizing and suction unit also when the container does not feature a fluidizing bottom for fluidization of the powder. The unit can be inserted through an opening in a container lid and, as the powder quantity decreases, lowered deeper into the container while being advanced axially in it. Placing the container on a vibrator facilitates the suction withdrawal of powder which has solidified in the container by storage and shipping.

The second named, EP 0 337 132 A2, states that a feed pump for the powder can in known fashion be used as an injection device and that when using such a fluidizing and suction withdrawal unit, with which the powder can be sucked directly out of a shipping container, there will be no additional, separate powder container required, but the powder can be fed directly from the shipping container to a powder processing device. The only container required is thus the shipping container of the powder which, consequently, may be a carton, a bag or a container from metal or plastic.

In the coating of articles with powder, already minimal fluctuations of the density of the powder-air flow or of the velocity of impact of the powder particles on the article being coated can lead to unsuitable coating qualities. While the aforementioned EP 0 337 132 A2 states that the powder can be fed to a processing device without an intermediate container, this may be true for powdery sand or other materials, but not for coating powder. Tests performed with known devices in the context of the invention have shown that with them powder quantities per unit of time cannot be fed with a consistency sufficient for an adequate quality of surface coatings. Furthermore, the tests performed in the framework of the invention have demonstrated that under certain operating conditions the powder merely is stirred up in uncontrolled fashion in the container, whereas a "fluidized state" as required for a suction withdrawal, that is, a condition in which the powder particles float in an air cushion in such a way that they can be withdrawn by suction, is not achieved. Moreover, it has been demonstrated in the framework of the invention that the prior devices will under certain operating conditions "fall through" the powder in the container, instead of producing at the powder surface a fluidized powder layer. This, too, renders prior devices unsuited for direct connection to a spray device, without the intermediary of an intermediate container that features a fluidizing bottom of its own for a uniform fluidization of the powder. Furthermore, prior devices involve the risk of powder overflowing out of the container. If the container is a bag, uncontrolled movements of the fluidizing and suction withdrawal device give rise to the risk of damaging the bag.

SUMMARY OF THE INVENTION

The problem underlying the invention is to avoid the said disadvantages and provide a pneumatic powder feed device with which powder can be withdrawn from a powder container that does not comprise a fluidizing bottom, at a feed quantity per unit of time that is so consistent that coating powder can be sprayed on articles with a sufficiently good coating quality also with a spray device that is connected directly to it, without an intermediate container. At the same time, the invention is to avoid that the device will "fall through" the powder in the container, that the powder is stirred up in the fashion of dust, without achieving a stable state of fluidization as required for the suction withdrawal, or that the powder is blown out of the container.

This problem is solved according to the invention by the characterizing features of claim 1.

Further characteristics of the invention are set forth in the subclaims.

BRIEF DESCRIPTION OF THE DRAWINGS

The invention will be explained hereafter with reference to the drawing and with the aid of a preferred embodiment. The drawing shows in FIG. 1 a vertical section of the inventional pneumatic powder feed for coating powder.

DESCRIPTION OF THE ILLUSTRATED EMBODIMENT

Figure 1:
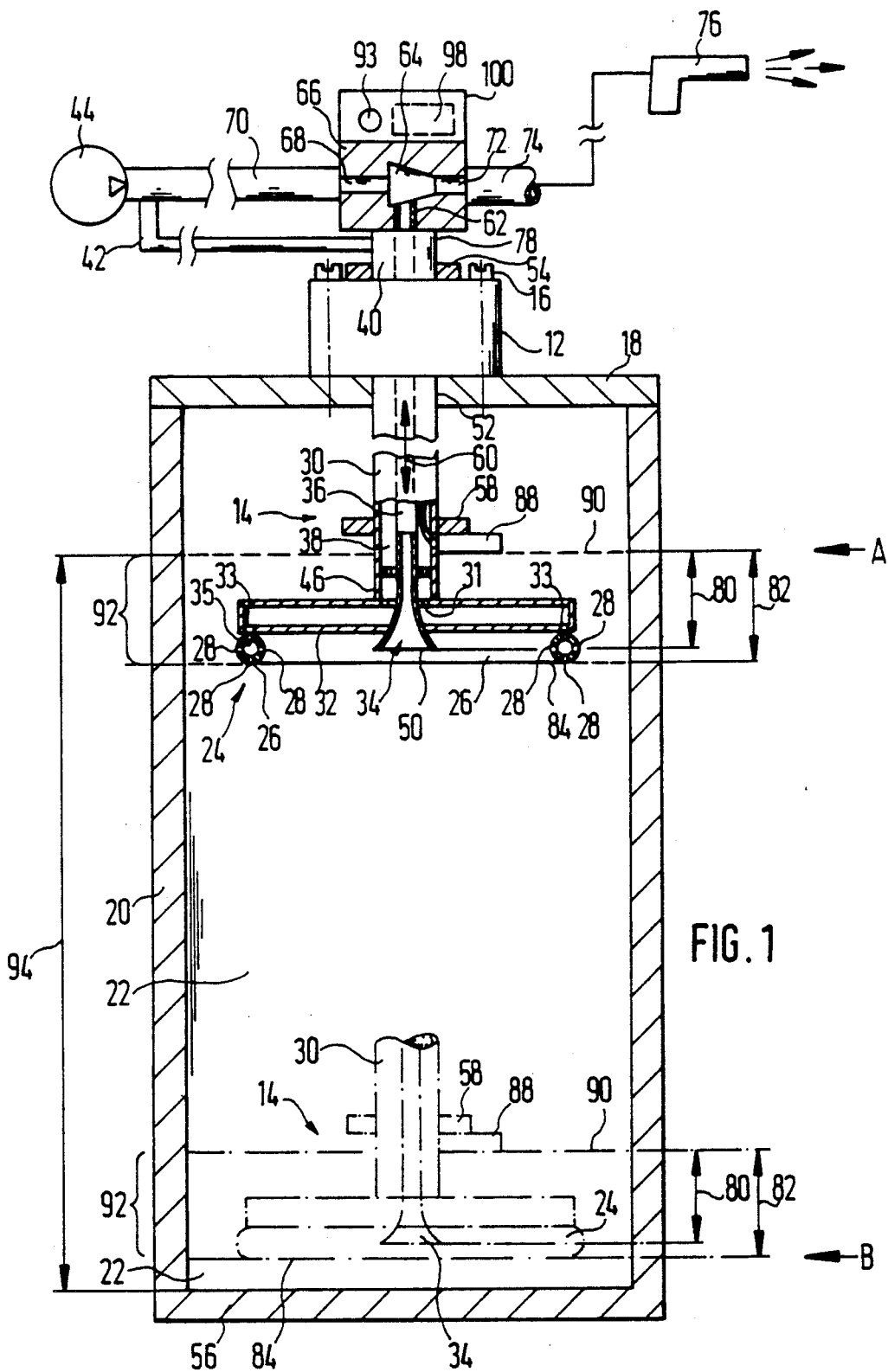

The inventional powder feed illustrated in FIG. 1 comprises a feed device 12 for the vertical guidance and movement of a fluidizing and suction withdrawal unit 14. The feed device 12 is mounted by means of screws 16 on a carrier 18, which presently is the lid of a container 20 holding the powder 22. The fluidizing and suction withdrawal unit 14 consists of a fluidizing device 24 and a suction withdrawal device 34, which jointly can be moved vertically as a unit. The fluidizing device 24 contains at least one fluidizing pipe 26 which extends ring-shaped on a horizontal plane and is provided with a number of narrow air discharge orifices 28, a vertical air feed pipe 30 and a connection pipe 32 which in terms of flow connects the air feed pipe 30 in mechanically rigid fashion via openings 31, 33 and 35 with the fluidizing pipe 26. The suction withdrawal device 34 comprises a suction pipe 36 which extends axially through the air feed pipe 30 and is connected with it in mechanically rigid fashion. Formed between the suction withdrawal pipe 36 and the air feed pipe 30 is a cross-sectionally ring-shaped air feed channel 38 which at the upper end 40 connects via a hose 42 with a compressed air supply 44 and on the bottom end 46 with the interior of the connection pipe 32. Flaring in funnel fashion, the bottom end 50 of the suction withdrawal pipe 36 is contained approximately at the mid-level of the fluidizing pipe 26. The air feed pipe 30, together with the suction withdrawal pipe 36 accommodated in it, extends through an opening 52 formed in the center of the lid 18 and through the feed device 12 arranged above it, from which the two pipes protrude upward. Their lowest position is given when a stop 54 fastened to the air feed pipe 30 bears on the feed device 12, as illustrated in FIG. 1. In this position, illustrated at the top in FIG. 1, the fluidizing pipe 26 and the bottom end 50 of the suction withdrawal pipe 36 are not contained in the top position illustrated in the container, though, but on or near the container bottom 56 as illustrated in FIG. 1 in the container, bottom, by broken lines as position "B." An upper position "A" is assumed by the fluidizing pipe 26 and the bottom end 50 of the suction withdrawal pipe 36 whenever a second stop 58 bears from below on the lid 18. The second stop 58 is fastened on the air feed pipe 30, above the fluidizing pipe 26, with a small vertical spacing. The space depends on the size of the container 20 and the size of the powder feed used for it. The two stops 54 and 58 thus determine the maximum possible vertical stroke 60 across which the fluidizing and suction withdrawal unit 14 can be moved by the feed device 12. According to a modification option, the feed device 12 may be waived and the fluidizing and suction unit 14 moved up and down manually. The upper end 62 of the suction withdrawal pipe 36 is connected to the vacuum area 64 of an injector 66 serving as feed pump, the inlet 68 of which injector connects via a hose 70 to the compressed air supply 44 while its outlet 72 connects by way of a hose 74 to the spray gun 76 for the spray coating of articles. The injector 5 is fastened to the upper ends 78 and 62 of the air feed pipe 30 and suction withdrawal pipe 36 and sucks fluidized powder out of the container 20 via the suction withdrawal pipe 36, feeding the powder then within an air flow through the hose 74 to the spray gun 76.

Fastened to the fluidizing and suction withdrawal unit 14, at a certain height level 80 above the end 50 of the suction withdrawal pipe 36, and thus also at a certain height level 82 above the lower surface 84 of the fluidizing pipe 26, is a level sensor 88. In the embodiment illustrated in the drawing, the level sensor 88 is fastened on the air feed pipe 30 below the second stop 58. The height spacings 80 and 82 are sufficiently large for the level sensor 88 to respond to the level 90 of the fluidized powder layer 92 above the powder 22 and to generate a certain electrical signal as the bottom end 50 of the suction withdrawal pipe 36 reaches a certain depth in the fluidized powder layer 92. The fluidized powder layer 92 is in known fashion created in that the upper layer of the powder 22 is held, by the air of the compressed air supply 44, in a "floating condition" in which the air-powder mixture possesses essentially the same "fluidity" as a fluid. The level sensor 88 captures the level 90 and generates in contingence on it an electrical signal which on an electrical display 93 indicates whether the level sensor 88 is located at the level 90 of the fluidized powder layer 92. Moreover, the electrical signal of the level sensor 88 controls the feed device 12 in such a way that the level sensor 88, along with the fluidizing and suction withdrawal unit 14, follows the level 90 of the fluidized powder layer 92, thus being lowered along with the level 90 as the container is being emptied, so that the level sensor 88 will always be located at the height of the level 90. Of necessity, also the bottom end 50 of the suction withdrawal pipe 36 has thus always the same height spacing 80 from the level 90 of the fluidized powder layer 92, and the bottom surface 84 as well as the air outlet openings 28 of the fluidizing pipe 26 have always the same height spacing 82 from the level 90 of the fluidized powder layer 92, depending on the extent to which the powder container is still full or already empty. This guarantees inventionally that in the fluidized powder layer 92, in the area of the powder-withdrawing end 50 of the suction withdrawal pipe 36 and independently of the powder level 94 in the container 90, always the same powder concentration and same powder-air flow conditions will prevail in the container 20. This assures that the injector 66, irrespective of the powder level 94, will always feed a constant amount of powder to its outlet 72, based on a certain air flow through the injector 66 from the compressed air supply 44. Achieved thereby with the spray gun 76 is a consistently good coating quality of the article coated with the powder, also when the spray gun 78 is connected directly to the outlet 72 of the injector 66.

The level sensor 88 may comprise an electrical power supply or voltage supply and emit an electrical signal, depending on whether or not the sensor is at the level 90. More favorable, however, is an electrical circuit of known type which has a branch whose resistance is varied by the level sensor 88 in contingence on whether it is at the level 90. Such an electrical circuit, along with an electrical display, is accommodated in a housing 100 on the injector 66 and, the wiring technique being known to the expert, is not described here in detail. Similarly, in details of the feed device 12 are not described here, since enough feed devices for reciprocating movements are known to the expert.

The display 93 offers the option of manually making the fluidizing and suction withdrawal unit 14 follow the level 90 of the fluidized powder layer 92, without a feed device 12. The wiring of the display 93 is preferably such that it will generate an optical signal as long as the level sensor 88 is at the level 90 of the fluidized powder layer 92, whereas the optical signal extinguishes when the height position of the level sensor 88 varies from that of the level 90 of the fluidized powder layer.

Instead of a manually operated spray gun 76, also automatic spray devices may be connected to the outlet 72 of the injector 66. Depending on powder type, type of container—massive container, box, flexible bag or similar—and contingent on other criteria, it is possible, naturally, to also place the container on a vibrator. A vibrator facilitates the fluidization of the powder.

What is claimed:

1. Pneumatic powder feed, specifically for coating powder, comprising a fluidizing and suction withdrawal unit which can be lowered into a container holding a powder, so as to fluidize the powder in the container and withdraw the fluidized powder by suction, the fluidizing and suction withdrawal unit (14) comprising a level sensor (88) which generates a signal in contingence on the immersion depth (80, 82) to which the fluidizing and suction withdrawal unit (14) is immersed in a powder layer (92) fluidized by it.

2. Pneumatic powder feed according to claim 1, and further comprising a feed device which controls the immersion movement of the fluidizing and suction withdrawal unit (14) in contingence on the signal of the level sensor (88).

3. Pneumatic powder feed according to claim 1 or 2, and further comprising a display (93) which in contingence on the signal of the level sensor (88) generation an optical or acoustic signal.

4. Pneumatic powder feed according to claim 1 and further comprising a spray device (76) for spraying powder on an article to be coated, said fluidizing and suction withdrawal unit (14) including a suction withdrawal channel (36), and a feed pump (66), said spray device being connected to said suction withdrawal channel (36) of the fluidizing and suction withdrawal unit (14), via said feed pump (66).

5. Pneumatic powder feed according to claim 2 and further comprising a spray device (76) for spraying powder on an article to be coated, said fluidizing and suction withdrawal unit (14) including a suction withdrawal channel (36), and a feed pump (66), said spray device being connected to said suction withdrawal channel (36) of the fluidizing and suction withdrawal unit (14) via said feed pump (66).

6. Pneumatic powder feed according to claim 3 and further comprising a spray device (76) for spraying powder on an article to be coated, said fluidizing and suction withdrawal unit (14) including a suction withdrawal channel (36), and a feed pump (66), said spray device being connected to said suction withdrawal channel (36) of the fluidizing and suction withdrawal unit (14) via said feed pump (66).

* * * * *